United States Patent [19]

Hicks et al.

[11] Patent Number: 4,525,650
[45] Date of Patent: Jun. 25, 1985

[54] STARTING AND OPERATING METHOD AND APPARATUS FOR DISCHARGE LAMPS

[75] Inventors: John M. Hicks, Penn Hills; Joseph C. Engel, Monroeville; Robert J. Spreadbury, Murrysville; Robert T. Elms, Monroeville; Gary F. Saletta, Irwin, all of Pa.

[73] Assignee: North American Philips Lighting Corporation, New York, N.Y.

[21] Appl. No.: 569,547

[22] Filed: Jan. 10, 1984

Related U.S. Application Data

[63] Continuation of Ser. No. 347,274, Feb. 11, 1982, abandoned.

[51] Int. Cl.$^3$ .......................................... H05B 37/02
[52] U.S. Cl. .................... 315/226; 315/219; 315/239; 315/242; 315/243; 315/283; 315/DIG. 7
[58] Field of Search .......... 315/201, 205, 226, 209 R, 315/222, 283, 137, 219, 239, 242, 243, 283, DIG. 7; 363/101, 37

[56] References Cited

U.S. PATENT DOCUMENTS

| | | | |
|---|---|---|---|
| 3,517,254 | 6/1970 | McNamara | 315/91 |
| 3,723,808 | 3/1973 | Jones | 315/95 |
| 3,753,071 | 8/1973 | Engel et al. | 315/201 |
| 3,753,541 | 5/1973 | Elms | 363/37 |
| 3,787,751 | 1/1974 | Farrow | 315/137 |
| 4,075,476 | 2/1978 | Pitel | 315/209 R |
| 4,084,217 | 4/1978 | Brandli et al. | 363/4 |
| 4,109,307 | 8/1978 | Knoll | 363/101 |
| 4,161,672 | 7/1979 | Cap et al. | 313/220 |
| 4,170,744 | 10/1979 | Hansler | 315/90 |
| 4,170,746 | 10/1979 | Davenport | 315/246 |
| 4,187,449 | 2/1980 | Knoble | 315/205 |
| 4,350,930 | 9/1982 | Peil | 315/49 |

OTHER PUBLICATIONS

Illuminating Engineering, vol. 54, Jan. 59, p. 69.

Primary Examiner—Harold Dixon

[57] ABSTRACT

Starting and operating method and apparatus for discharge lamps comprises a current-limiting and rectifying means which provides at its output a low-ripple current-limited direct current. To effect lamp starting, a series-connected inductor and capacitor form a high "Q" resonant circuit with the capacitor connected across the lamp to be operated. This starting circuit connects through a blocking capacitor and charging resistor across the low-ripple source of DC. A pair of transistors which comprise an oscillator are connected emitter-to-collector across the source of DC, with the common-connected emitter and collector connected to the blocking capacitor. A drive air-core transformer has separate feedback windings in the starting and operating circuits and drive windings are associated with the transistors. A trigger diode is used to initially pulse one of the transistors which initially oscillate to generate square waves having a frequency corresponding to the resonant frequency of the starting circuit. After the lamp strikes, the transistors operate in a self-oscillating mode with the operating frequency determined by the rate of current flow into the operating feedback winding.

10 Claims, 4 Drawing Figures

STARTING AND OPERATING METHOD AND APPARATUS FOR DISCHARGE LAMPS

This is a continuation of application Ser. No. 347,274 filed Feb. 11, 1982 now abandoned.

BACKGROUND OF THE INVENTION

This invention relates to starting and operating method and apparatus for discharge lamps and, more particularly, to such starting and operating method and apparatus which operate discharge lamps on square waves at a relatively low frequency wherein the apparatus current-limiting components are included in circuit prior to the oscillator elements which form the operating square waves.

Miniature high-pressure metal-vapor discharge lamps are described in U.S. Pat. No. 4,161,672, dated July 17, 1979 To Cap et al. Such lamps are known to have potential utility as screw-in replacements for incandescent lamps. These lamps can also be operated with high efficacy at frequencies above the audible range. With such operation, there exist certain "windows" of permissible operating frequency as well as regions of instability for the arc and such a mode of high-frequency operation is disclosed in U.S. Pat. No. 4,170,746, dated Oct. 9, 1979 to Davenport. These lamps can also be operated from direct current. In the usual case, with DC operation or high-frequency operation, it is normally required that the available AC be rectified and filtered with a relatively large capacity aluminum electrolytic capacitor. Such filtering substantially reduces the power factor and aluminum electrolytic capacitors are sensitive to higher temperatures of operation and display a relatively short operating life, in some cases.

It is known to operated discharge lamps with a rectified current wherein the current-limiting impedance is placed into the line prior to rectification. Such a mode of operation is shown in U.S. Pat. No. 3,787,751, dated Jan. 22, 1974 to Farrow. A variety of such arrangements are also shown in U.S. Pat. No. 4,084,217, dated Apr. 11, 1978 to Brandli et al. and U.S. Pat. No. 4,187,449, dated Feb. 5, 1980 to Knoble.

When high-intensity-discharge lamps are first started, they normally require a few minutes to warm up and generate operating pressure within the envelope in order to produce full light output. In addition, after momentary periods of power interruption, the lamps must cool down before they can be reignited, after which the pressure must again build up to achieve rated light output. It is well known to provide standby incandescent lighting for such lamps and a wide variety of circuits are available. One such standby lighting system is disclosed in U.S. Pat. No. 3,517,254, dated June 23, 1970 to McNamara. Another type of such a standby lighting system is disclosed in U.S. Pat. No. 3,723,808, dated Mar. 27, 1973 to Jones. In U.S. Pat. No. 4,170,744, dated Oct. 9, 1979 to Hansler is disclosed a standby lighting system for use with a miniature metal-vapor lamp with the combination formed as a screw-in light source.

In the case of fluorescent lamps, it is known to operate such lamps with relatively low frequency square wave current in order to achieve an efficacy which is equivalent to that obtained with sine-wave operation at higher frequencies. Such a mode of operation for fluorescent lamps is disclosed in "Illuminating Engineering", Vol. 54, January 1959, p. 69, discussion of article by Campbell.

SUMMARY OF THE INVENTION

There is provided a method and apparatus for starting and operating discharge lamp means wherein the apparatus input terminals are adapted to be connected across a source of AC potential of predetermined magnitude and the apparatus has output terminals across which the discharge lamp to be operated is adapted to be operatively connected. The apparatus comprises AC current-limiting and rectifying means having an input connected to the apparatus input terminals and operable to generate at the output thereof a current-limited low-ripple DC potential. A lamp means starting circuit comprising series-connected inductor means and capacitor means form a high "Q" resonant circuit, with the starting circuit capacitor means connected across the apparatus output terminals. The series-connected inductor and capacitor in turn are connected via a charging resistor and a blocking capacitor across the output of the AC current-limiting and rectifying means. A pair of transistors comprising oscillator means are connected emitter-to-collector in series arrangement across the output of the AC current-limiting and rectifying means, with the common-connected emitter and collector of the transistors connected to the blocking capacitor. A drive air-core transformer means comprises a pair of feedback windings and a pair of driving windings which control the oscillations of the transistors. A first of the feedback windings connects in series with the starting circuit inductor and the capacitor and the second of the feedback windings and a current-controlling resistor are connected in parallel with the starting circuit inductor and capacitor. A first of the driving windings connects between the emitter and base of one of the transistors and the second of the driving windings connects between the emitter and base of the other transistor. A trigger means is responsive to initial energization of the apparatus to apply a turn-on pulse to the base of one of the transistors to initiate oscillations therebetween to generate square waves.

In the operation of the circuit, after initial energization of the apparatus and until the discharge lamp is started, the transistors alternately conduct to deliver square waves of current to the lamp at an oscillation frequency which is determined by the resonant frequency of the starting circuit series-connected inductor and capacitor. After the lamp is started, the transistors alternately conduct to deliver square waves of current to the operating lamp at an oscillation frequency which is determined by the rate of current flow into the second feedback winding.

BRIEF DESCRIPTION OF THE DRAWINGS

For a better understanding of the invention, reference may be had to the preferred embodiments, exemplary of the invention, shown in the accompanying drawings, in which.

DESCRIPTION OF THE PREFERRED EMBODIMENTS

Figure 1:
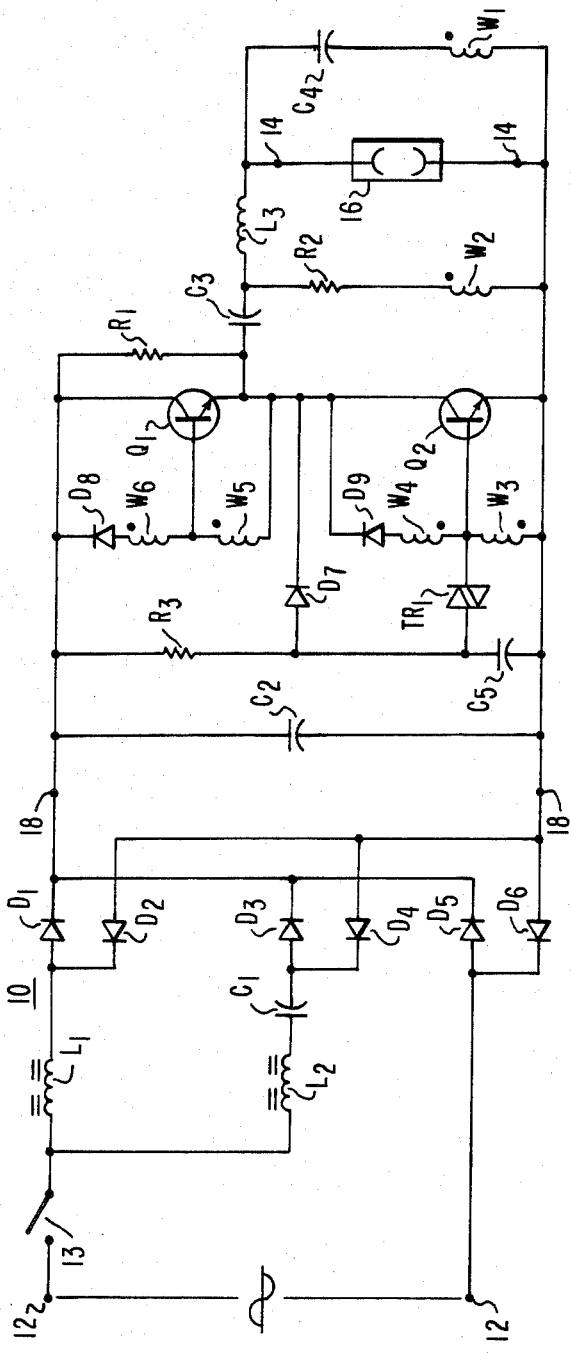
FIG. 1 is a circuit diagram of the preferred apparatus for operating a miniature metal-vapor lamp.

In FIG. 1 is shown the circuit diagram for the apparatus 10 for starting and operating discharge lamps. The apparatus 10 has input terminals 12 adapted to be connected with a switch 13 across a source of AC potential of predetermined magnitude and there are provided output terminals 14 across which the discharge lamp 16 is adapted to be operatively connected.

Figure 3:
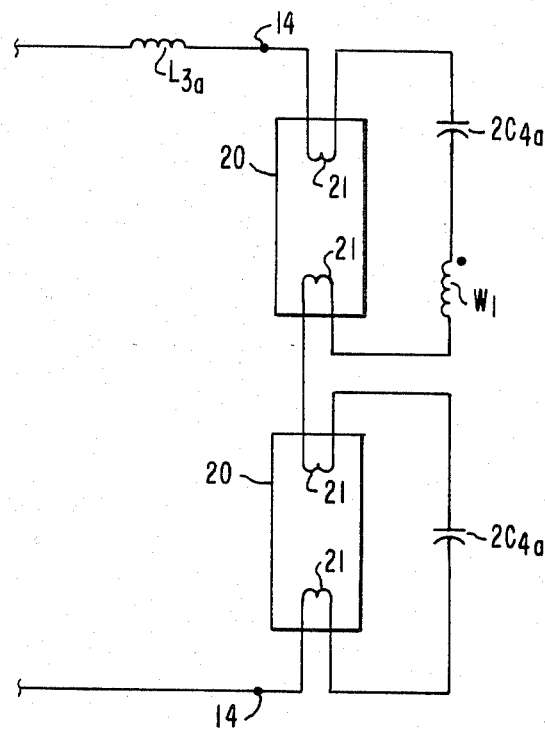
FIG. 3 is a partial showing of an apparatus similar to that of FIG. 1 wherein the lamp means to be operated comprised two series-connected fluorescent lamps.

The apparatus comprises an AC current-limiting and rectifying means having an input connected to the apparatus input terminals 12 and operable to generate across the output 18 thereof a current-limited low-ripple DC potential. A similar rectifying device is shown in FIG. 3 of U.S. Pat. No. 4,084,217 which is referenced in the background section. Briefly, the inductors $L_1$ and $L_2$ are included in separate branches of one side of the AC input line and a capacitor $C_1$ connects in series with the inductor $L_2$ to form a second phase with leading current. The diodes $D_1-D_6$ are connected to the outputs of the three circuit branches as a three-phase full-wave rectifier bridge, the output of which appears across terminals 18 as a low-ripple DC. This DC output is current limited by the inductors $L_1$ and $L_2$ and capacitor $C_1$. For the lamp types involved, such a rectifying device is particularly adapted for operation from power mains of 277 volt, 60 Hz, for U.S. applications and 220 volt, 50 Hz for European applications. It should be understod that a high-reactance transformer could be substituted into this circuit to accommodate any of a variety of source voltages, in the manner as disclosed in Pat. No. 4,187,449 referenced hereinbefore.

It is desirable, but not necessary, to parallel the output terminals 18 with a small high-frequency bypass capacitor $C_2$ in order to ensure that none of the high-frequency components which are generated by the apparatus 10 are passed back into the power mains. The foregoing rectifying circuit thus provides a low-ripple DC power output without the need for an aluminum electrolytic capacitor and, in addition, the DC is current limited. This is advantageous in that the operating frequency of the lamps preferably will fall within the acoustic range. Since the current-limiting function occurs before the switching function, the current-limiting components are not subjected to square wave currents at the lamp operating frequency which effectively eliminates any tendency of the ballasting components, such as laminations of a magnetic structure, to "sing" at the square wave excitation frequency. The power factor is typically about 94%.

The particular lamp 16 which is intended to be operated in the circuit is a miniature metal-vapor lamp having a rated power input of 35 watts. Such a lamp requires a relatively high voltage pulse to initiate the discharge or strike the lamp and to achieve starting thereof, there is provided a series-connected inductor means $L_3$ and capacitor means $C_4$ which form a high "Q" resonant circuit with the capacitor $C_4$ connected across the apparatus output terminals 14. The starting circuit series-connected inductor $L_3$ and capacitor $C_4$ connect via a charging resistor $R_1$ and blocking capacitor $C_3$ across the output terminals 18 of the rectifying means 10. When the apparatus is turned on, the voltage which is developed across $C_4$ is essentially the voltage developed across the lamp during starting and it is established by the relative values of $L_3$ and $C_4$ and the current which is passed by the rectifying apparatus 10. During the starting operation, $L_3$ and $C_4$ have a representative "Q" of about 20 and in the case of a 35-watt metal-vapor lamp, approximately 1500 volts is needed to start the lamp. This voltage is readily achieved by controlling the input current together with the series-resonant circuit $L_3-C_4$. When the apparatus is initially turned on, current flows through $R_1$ to charge $C_3$ to a voltage which approximates that developed across terminals 18.

A pair of transistors $Q_1$, $Q_2$ comprise oscillator means and are connected, emitter-to-collector, in series arrangement across the output terminals 18 of the rectifying means 10, with the common-connected emitter and collector of these transistors connected to the blocking capacitor means $C_3$.

A drive air-core transformer means comprises a pair of feedback or primary windings $W_1$, $W_2$ and a pair of driving or secondary windings $W_3$, $W_5$. The first of the feedback windings $W_1$ connects in series with the starting circuit inductor $L_3$ and capacitor $C_4$ and the second of the feedback windings $W_2$ and a current-controlling resistor means $R_2$ connect in parallel with the starting circuit inductor $L_3$ and capacitor $C_4$. The first of the driving windings $W_3$ connects between the emitter and base or control electrode of the transistor $Q_2$ and the second of the driving windings $W_5$ connects between the emitter and base or control electrode of the other transistor $Q_1$.

To initiate the operation of the device after it is turned on, there is provided a trigger means comprising resistor $R_3$, diode $D_7$, capacitor $C_5$ and trigger diode $TR_1$. When the switch 13 is closed, $C_5$ charges through $R_3$ and when the trigger diode $TR_1$ has a voltage of approximately 40 volts developed thereacross, it conducts and the $C_5$ discharges into the base of $Q_2$, turning $Q_2$ on momentarily. This initiates oscillations between the transistors to generate square waves. Prior to the lamp 16 having a discharge initiated therein, current will flow through $L_3$, $C_4$ and the feedback winding $W_1$ and as a result, the oscillator means comprising the transistors $Q_1$ and $Q_2$ will tend to oscillate at the resonant frequency which is established by $L_3$ and $C_4$. As indicated hereinbefore, because of the resonant nature of this circuit, this will apply a very high voltage across the apparatus output terminals 14.

Once the discharge in the lamp 16 is initiated, the voltage across the apparatus output terminals will drop to somewhere in the range of 20 to 30 volts. This in turn causes the current through the feedback winding $W_1$ to drop to a small fraction of its initial value, with a representative value of this current being 1/50 of its initial value. The oscillator frequency is then established by current flow into the feedback winding which is established by the value of resistor $R_2$. The drive transformer is an air-core transformer and the magnetizing inductance is quite low. The current which is flowing into $W_2$ is initially transformed and flows out of the dotted terminal of $W_5$ forming the base current for $Q_1$, which turns $Q_1$ on. Eventually, the combination of rising magnetizing current and transformed load current equals the load current in $W_2$ causing $Q_1$ to begin to turn off. This reduces the voltage across $R_2-W_2$ with the result that the trapped magnetizing current flows into the dotted terminal of $W_3$, which turns $Q_2$ on. This self-oscillating mode continues for the normal operation of the lamp, with a typical oscillating frequency being 1 kHz. An additional advantage of $L_3$-$C_4$ is to provide some filtering of the current into the lamp, during normal operation of the lamp, thereby reducing any tendency for RF radiation.

Windings $W_4$ and $W_6$ and associated series-connected diodes $D_8$ and $D_9$ are connected between the base and collector of each of the transistors $Q_1$ and $Q_2$ and their function is to prevent transistor saturation during normal operation of the apparatus, in order to maintain the switching speeds thereof. A typical switching speed for the transistors utilized is in the microsecond range.

In the case of miniature metal-vapor lamps, they display severe reignition voltage requirements between cycles when operated with sine-wave power at commercial frequencies. This can be avoided by going to very high frequencies, but this introduces the problem of arc-tube instability. By operating these lamps with square wave power, the reignition problem is eliminated because the plasma conductivity remains essentially constant through the polarity reversals. The square wave power also provides for very smooth and acoustically quiet operation of the arc tube, permitting it to be operated with a single current amplitude selected for best efficacy. The frequency of polarity reversal can be varied over a wide range, including the acoustic range such as 16 Hz to 16 kHz, since there are no audible noise problems presented by the current-limiting inductors which are isolated from the oscillator by the rectifier.

Following is a component chart for the circuit elements as shown in FIG. 1 which are designed for operating a miniature metal-vapor lamp rated at 35 watts.

| COMPONENT CHART | |
| --- | --- |
| $L_1$ | 1.2 H |
| $L_2$ | 1.2 H |
| $L_3$ | 700 μH |
| $D_1$-$D_9$ | 1N5399 |
| $C_1$ | 3 μF |
| $C_2$ | 1 μF |
| $C_3$ | 1 μF |
| $C_4$ | 0.022 μF |
| $C_5$ | 0.047 μF |
| $Q_1$-$Q_2$ | MJ 13003 |
| $TR_1$ | HT 40 |

Figure 2:
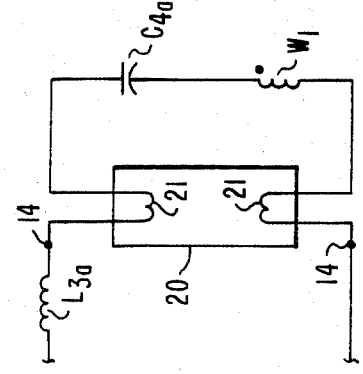
FIG. 2 is a partial showing of an apparatus similar to that of FIG. 1 wherein the lamp to be operated is a single fluorescent lamp.

The foregoing circuit can also be utilized to operate low-pressure, positive-column fluorescent lamps 20 such as 4 foot fluorescent lamps having a tube diameter of 1 inch (2.54 cm). Such lamps are typically quite difficult to start on conventional rapid-start ballasts and the foregoing circuit will start and operate such lamps very efficiently. In the partial circuit diagram as shown in FIG. 2, a single-fluorescent lamp 20 is connected across the apparatus output terminals 14 with the lamp electrodes 21 connected in series with the starting inductor $L_{3a}$ and capacitor $C_{4a}$ and winding $W_1$. In the partial circuit diagram as shown in FIG. 3, two fluorescent lamps 20 are similarly connected in series across the output terminals 14 of the apparatus. In such an embodiment, the capacitor portion of the starting circuit preferably is split into two capacitors $2C_{4a}$.

Figure 4:
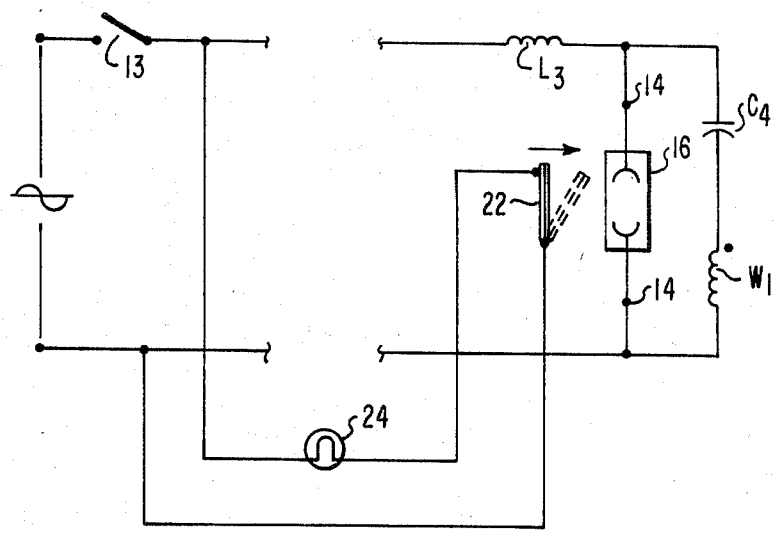
FIG. 4 is a partial showing of the apparatus of FIG. 1 wherein the lamp to be operated is a miniature metal-vapor lamp and there is also provided a standby incandescent light source to provide illumination after periods of power interruption and during lamp warm-up.

As is conventional in the art, where miniature metal-vapor lamps are used for general illumination purposes, it is desirable to provide some type of standby lighting so that general illumination is provided during lamp warm-up and also immediately after momentary power failures when the metal-vapor lamp has dropped out and will not start because of the residual pressures therein. The embodiment as shown in FIG. 4 comprises a circuit corresponding to that shown in FIG. 1, with most of the elements omitted in this showing, wherein an additional bi-metal switch 22, which is normally closed when not heated, is placed in receptive proximity to the miniature metal-vapor lamp 16. When the apparatus is initially energized by closing the switch 13, the bi-metal switching member 22 is closed and the incandescent source 24 is energized. Once the miniature metal-vapor lamp 16 is normally operating, the switch 22 opens, thereby deenergizing the incandescent source 24. When the switch 22 closes after a momentary power interruption, the standby incandescent source 24 is again energized to provide standby illunination. Many other types of standby energizing devices and circuitry can be substituted for the bi-metal switch in the embodiment as shown in FIG. 4.

For use with miniature metal-vapor lamps, the apparatus of FIG. 1 could be incorporated as a part of a separate ceiling fixture wherein the miniature metal-vapor lamp and standby incandescent lamp could both be enclosed within the same diffusing globe. Alternatively, such a fixture could be designed as a screw-in or plug-in incandescent lamp replacement wherein the miniature metal-vapor or metal-halide lamp could be formed therewith as an integral unit or made replaceable. Likewise, the standby incandescent source, if used, could be made integral therewith or made replaceable.

In actual tests conducted with miniature metal-halide lamps operated with square wave power, the reignition voltage spikes, as are encountered during operation with commercial sinewave power, were essentially eliminated. This is attributed to the very rapid rise time of the square waves and the lamp discharges are always in a conducting state, even during polarity reversal. The lamps were operated with square wave frequencies as low as 16 Hz and as high as 16 kHz and no noise was detected from the operating lamps. Also, noise from the ballast is eliminated.

In some discharge lamp ballasts which utilize high-reactance transformers, there is sometimes encountered a very minor noise due to the commercial AC energizing power. This can be eliminated by proper ballast construction, as is well known. In similar fashion, the inductors $L_1$ and $L_2$ of the present apparatus may, in some cases, display a very minor but tolerable noise during lamp operation due to the commercial AC energizing power. Proper construction of the inductors will eliminate even this minor noise.

We claim:

1. Apparatus for starting and operating miniature metal-vapor discharge lamp means, said apparatus having input terminals adapted to be connected across a source of AC potential of predetermined magnitude, and said apparatus having output terminals across which said discharge lamp means is adapted to be operatively connected, said apparatus comprising:

AC current-limiting and rectifying means having an input connected to said apparatus input terminals and operable to generate at the output thereof a current-limited low-ripple DC potential;

a lamp means starting circuit comprising series-connected inductor means and capacitor means forming a resonant circuit, said starting circuit capacitor means connected across said apparatus output terminals, a blocking capacitor and a charging impedance connected in series with said starting circuit, and the series combination of said starting circuit, blocking capacitor and charging impedance connected across said output of said AC current-limiting and rectifying means;

a pair of transistors comprising oscillator means electrically connected in series arrangement across said output of said AC current-limiting and rectifying means, and the connection between said transistors being electrically connected to said blocking capacitor means;

air-core transformer means comprising a pair of feedback windings and a pair of driving windings, a first of said feedback windings connecting in series with said starting circuit inductor means and capacitor means, and the second of said feedback windings and a current-controlling impedance means connecting in parallel with said starting circuit inductor means and capacitor means, a first of said driving windings connecting in circuit between the base and the emitter of one of said transistors and the second one of said driving windings connecting in circuit between the base and the emitter of the other of said transistors; and trigger means responsive to initial energization of said apparatus to apply a turn-on pulse to the base of one of said transistors to initiate oscillations between said transistors to generate square waves; whereby after initial energization of said apparatus and until said lamp means is started said transistors alternately conduct to deliver square waves of current to said lamp means at an oscillation frequency determined by the resonant frequency of said starting circuit series-connected inductor means and capacitor means, and said air-core transformer having a magnetizing inductance such that after said lamp means is started said transistors alternately conduct to deliver square waves of current to said operating lamp at an oscillation frequency determined by the rate of current flow into said second feedback winding.

2. Apparatus for starting and operating metal-vapor discharge lamp means, said apparatus having input terminals adapted to be connected across a source of AC potential of predetermined magnitude, and said apparatus having output terminals across which said discharge lamp means is adapted to be operatively connected, said apparatus comprising:

AC current-limiting and rectifying means having an input connected to said apparatus input terminals and operable to generate at the output thereof a current-limited low-ripple DC potential;

a lamp means starting circuit comprising series-connected inductor means and capacitor means forming a high "Q" resonant circuit, said starting circuit capacitor means connected across said apparatus output terminals, and said starting circuit series-connected inductor means and capacitor means connecting via a charging resistor and blocking capacitor means across said output of said AC current-limiting and rectifying means;

a pair of transistors comprising oscillator means are connected emitter-to-collector in series arrangement across said output of said AC current-limiting and rectifying means, with the common-connected emitter and collector of said transistors connected to said blocking capacitor means;

a drive air-core transformer means comprising a pair of feedback windings and a pair of driving windings, a first of said feedback windings connecting in series with said starting circuit inductor means and capacitor means, and the second of said feedback windings and a current-controlling resistor means connecting in parallel with said starting circuit inductor means and capacitor means, a first of said driving windings connecting between the emitter and base of one of said transistors and the second of said driving windings connecting between the emitter and base of the other of said transistors; and trigger means responsive to initial energization of said apparatus to apply a turn-on pulse to the base of one of said transistors to initiate oscillations between said transistors to generate square waves; whereby after initial energization of said apparatus and until said lamp means is started, said transistors alternately conduct to deliver square waves of current to said lamp means at an oscillation frequency determined by the resonant frequency of said starting circuit series-connected inductor means and capacitor means, and after said lamp means is started, said transistors alternately conduct to deliver square waves of current to said operating lamp at an oscillation frequency determined by the rate of current flow into said second feedback winding.

3. The apparatus as specified in claim 2, wherein said discharge lamp means is a miniature-type metal-vapor discharge lamp.

4. The apparatus as specified in claim 3, wherein a standby incandescent light source is energized after power is interrupted and said discharge lamp is not yet started, and also during periods of warm-up for said discharge lamp.

5. The apparatus as specified in claim 2, wherein said discharge lamp means is of the low-pressure positive-column fluorescent type.

6. The apparatus as specified in claim 2, wherein said air-core transformer means also includes a pair of supplemental windings, one of each of said supplemental windings connect in series with diode means between the base and collector of one of each of said pair of transistors to prevent transistor saturation during operation of said apparatus.

7. The apparatus as specified in claim 6, wherein capacitor means connects across the output of said AC current limiting and rectifying means to by-pass from the AC source any high frequency components which are generated by said oscillator means.

8. A circuit for starting and operating a miniature metal-vapor discharge lamp, comprising:

a DC power supply circuit for supplying a current-limited DC electrical signal;

a lamp starting circuit comprised of an inductor and a capacitor connected in series and having respective values effective to define a resonant circuit;

an air-core transformer comprising a pair of feedback windings and a pair of driving windings;

a first of said feedback windings connected in series with said starting circuit for inducing driving winding currents in response to a current flowing through said starting circuit, a current-limiting impedance connected in series with the second of said feedback windings, and the series combination of said current-limiting impedance and said second feedback winding being connected in parallel with the series combination of said starting circuit and said first feedback winding for inducing driving winding currents in response to a current flowing through said current-limiting impedance and said second feedback winding;

a square wave oscillator circuit energized by the current-limited DC electrical signal for generating a square wave output signal, said oscillator circuit comprising a pair of transistors each having a base and a collector-emitter signal path with their respective collector-emitter signal paths connected in series, a first of said driving windings connected between the base and emitter of a first of said transistors and the second of said driving windings connected between the base and emitter of the second of said transistors; and said square wave oscillator connected for applying a square wave output signal to said resonant starting circuit.

9. In a discharge lamp starting and driving circuit including a controllable square wave oscillator circuit responsive to control signals for generating a square wave lamp driving output signal having a frequency determined by said control signals, and a resonant lamp starting circuit responsive to said oscillator circuit output signal for generating a lamp starting signal, the improvement comprising: means response to a current in said resonant lamp starting circuit for applying first control signals to said oscillator circuit effective to control said oscillator circuit to generate an output signal applied to said starting circuit and having a frequency determined by the resonant frequency of said starting circuit for generating a high amplitude lamp starting signal; and means for applying second control signals to said oscillator circuit effective to control said oscillator circuit to generate a square wave lamp driving signal having a frequency different from that of the lamp starting circuit resonant frequency after lamp starting is achieved; wherein said lamp starting circuit is a series resonant circuit comprised of an inductor and a capacitor in series, and a pair of output terminals for developing the lamp starting signal thereacross; said means for applying first control signals is comprised of an air-core transformer having a primary winding connected in series with said inductor and said capacitor and adjacent said capacitor for receiving current flowing through said series resonant starting circuit, and a secondary winding for developing in response to the current flowing through said series resonant circuit respective currents constituting the first control signals; said means for applying second control signals is comprised of a second primary winding of said air core transformer, an impedance element connected in series with said second primary winding, and the series combination of said second primary winding and said impedance element connected in parallel with said lamp starting circuit inductor and the opposite output terminal for developing the second control signals when a discharge lamp is operated by the starting and driving circuit; and one of said output terminals being connected to an end of said primary winding away from said capacitor and the second of said output terminals being connected to a side of said capacitor away from primary windings, whereby the lamp starting signal developed across said pair of output terminals is substantially equal to a voltage developed across said starting circuit capacitor, and a discharge lamp connected across said output terminals which in a conductive state is effective to shunt said capacitor and primary winding to reduce the current flowing through said primary winding to a sufficiently low value to render the first control signals ineffective to control said oscillator circuit.

10. In a discharge lamp starting and driving circuit including a controllable square wave oscillator circuit responsive to control signals for generating a square wave lamp driving output signal having a frequency determined by said control signals, and a resonant lamp starting circuit responsive to said oscillator circuit output signal for generating a lamp starting signal, the improvement comprising: means response to a current in said resonant lamp starting circuit for applying first control signals to said oscillator circuit effective to control said oscillator circuit to generate an output signal applied to said starting circuit and having a frequency determined by the resonant frequency of said starting circuit for generating a high amplitude lamp starting signal; and means for applying second control signals to said oscillator circuit effective to control said oscillator circuit to generate a square wave lamp driving signal having a frequency different from that of the lamp starting circuit resonant frequency after lamp starting is achieved; wherein said oscillator circuit is comprised of a pair of transistors each having a control electrode and a principal conduction path, said pair of transistors connected with their respective conduction paths in series and said pair of transistors responsive to control signals applied to their respective control electrodes to change the conductivity of their respective conduction paths according to the applied control signals; said lamp starting circuit is a series resonant circuit comprised of an inductor and a capacitor in series, and a pair of output terminals for developing the lamp starting signal thereacross; said means for applying first control signals is comprised of an air-core transformer having a primary winding connected in series with said inductor and said capacitor and adjacent said capacitor for receiving current flowing through said series resonant starting circuit, and secondary winding for developing in response to the current flowing through said series resonant circuit respective currents constituting the first control signals; said means for applying second control signals is comprised of a second primary winding of said air-core transformer, an impedance element connected in series with said second primary winding, and the series combination of said second primary winding and said impedance element connected in parallel with said lamp starting circuit inductor and the opposite output terminal for developing the second control signals when a discharge lamp is operated by the starting and driving circuit; and one of said output terminals being connected to an end of said primary winding away from said capacitor and the second of said output terminals being connected to a side of said capacitor away from primary windings, whereby the lamp starting signal developed across said pair of output terminals is substantially equal to a voltage developed across said starting circuit capacitor, and a discharge lamp connected across said output terminals which in a conductive state is effective to shunt said capacitor and primary winding to reduce the current flowing through said primary winding to a sufficiently low value to render the first control signals ineffective to control said oscillator circuit.

* * * * *